(12) United States Patent
Coleridge

(10) Patent No.: US 8,744,078 B2
(45) Date of Patent: Jun. 3, 2014

(54) SYSTEM AND METHOD FOR SECURING MULTIPLE DATA SEGMENTS HAVING DIFFERENT LENGTHS USING PATTERN KEYS HAVING MULTIPLE DIFFERENT STRENGTHS

(75) Inventor: Robert Coleridge, Bellingham, WA (US)

(73) Assignee: Secure Channels SA, Vaud (CH)

( * ) Notice: Subject to any disclaimer, the term of this patent is extended or adjusted under 35 U.S.C. 154(b) by 0 days.

(21) Appl. No.: 13/489,388

(22) Filed: Jun. 5, 2012

(65) Prior Publication Data

US 2013/0322618 A1    Dec. 5, 2013

(51) Int. Cl.
| | |
|---|---|
| H04L 9/00 | (2006.01) |
| H04L 9/06 | (2006.01) |
| G06F 21/62 | (2013.01) |
| H04K 1/00 | (2006.01) |
| H04L 9/30 | (2006.01) |
| H04N 21/234 | (2011.01) |

(52) U.S. Cl.
CPC .......... *H04L 9/0662* (2013.01); *G06F 21/6227* (2013.01); *H04N 21/234* (2013.01)
USPC .................. 380/44; 380/30; 380/46; 380/277; 380/282

(58) Field of Classification Search
CPC  H04L 9/0662; G06F 21/6227; H04N 21/234; H04N 21/2347
See application file for complete search history.

(56) References Cited

U.S. PATENT DOCUMENTS

| | | | |
|---|---|---|---|
| 5,479,513 A * | 12/1995 | Protopopescu et al. ........ 380/28 |
| 5,922,074 A | 7/1999 | Richard et al. | |
| 6,249,873 B1 | 6/2001 | Richard et al. | |
| 6,324,645 B1 | 11/2001 | Andrews et al. | |
| 6,539,093 B1 | 3/2003 | Asad et al. | |
| 6,671,804 B1 | 12/2003 | Kent | |
| 6,678,821 B1 | 1/2004 | Waugh et al. | |
| 6,711,679 B1 | 3/2004 | Guski et al. | |
| 6,738,912 B2 | 5/2004 | Buttiker | |
| 6,763,459 B1 | 7/2004 | Corella | |
| 6,895,501 B1 | 5/2005 | Salowey | |
| 6,898,710 B1 | 5/2005 | Aull | |
| 6,931,133 B2 | 8/2005 | Andrews et al. | |
| 6,934,393 B2 | 8/2005 | Aull | |
| 6,940,979 B1 | 9/2005 | Bobbitt | |
| 6,941,455 B2 | 9/2005 | Aull | |
| 7,024,226 B2 | 4/2006 | Sandberg et al. | |
| 7,028,181 B1 | 4/2006 | McCullough et al. | |
| 7,032,110 B1 | 4/2006 | Su et al. | |

(Continued)

*Primary Examiner* — Cordelia Zecher
*Assistant Examiner* — Trang Doan
(74) *Attorney, Agent, or Firm* — Steptoe & Johnson LLP

(57) ABSTRACT

A system and method for securing data and information is disclosed. Multiple cryptographic paradigms may be applied to multiple length data segments to encrypt such data to prevent unauthorized use. The system and method uses pattern keys. At least one pattern key uses a cryptographic paradigm different from the other pattern keys. Furthermore, each pattern key has a given key strength and at least one pattern keys key strength differs from the one or more other pattern keys used in the process. The pattern keys are applied to the data in accordance with a key pattern which defines the sequence that each pattern key is applied to the data. The length of each data segment may vary one from the other and such segment length is determined in accordance with the pattern key applied. In addition, the initial plaintext data may first be encrypted using a first password before the disclosed process is implemented.

19 Claims, 3 Drawing Sheets

(56) References Cited

U.S. PATENT DOCUMENTS

| | | |
|---|---|---|
| 7,069,440 B2 | 6/2006 | Aull |
| 7,080,409 B2 | 7/2006 | Eigeles |
| 7,107,248 B1 | 9/2006 | Asokan et al. |
| 7,127,607 B1 | 10/2006 | Su et al. |
| 7,206,936 B2 | 4/2007 | Aull et al. |
| 7,242,772 B1 * | 7/2007 | Tehranchi ............ 380/223 |
| 7,269,726 B1 | 9/2007 | Corella |
| 7,328,344 B2 | 2/2008 | Chang |
| 7,340,600 B1 | 3/2008 | Corella |
| 7,356,329 B2 | 4/2008 | Willey et al. |
| 7,366,904 B2 | 4/2008 | Roh et al. |
| 7,392,377 B2 | 6/2008 | Ogg et al. |
| 7,437,551 B2 | 10/2008 | Chan et al. |
| 7,475,250 B2 | 1/2009 | Aull et al. |
| 7,478,236 B2 | 1/2009 | Roh et al. |
| 7,493,486 B1 | 2/2009 | Jacobs et al. |
| 7,499,551 B1 | 3/2009 | Mire |
| 7,516,325 B2 | 4/2009 | Willey |
| 7,610,484 B2 | 10/2009 | Kapoor |
| 7,647,494 B2 | 1/2010 | Wray et al. |
| 7,657,037 B2 | 2/2010 | Callas |
| 7,657,748 B2 | 2/2010 | Gentry |
| 7,690,027 B2 | 3/2010 | Sandberg |
| 7,751,558 B2 | 7/2010 | Gentry |
| 7,787,865 B2 | 8/2010 | Willey et al. |
| 7,796,751 B2 | 9/2010 | Gentry |
| 7,797,533 B2 | 9/2010 | Murakawa |
| 7,809,941 B1 | 10/2010 | Thurman et al. |
| 7,894,420 B2 | 2/2011 | Tan |
| 7,912,906 B2 | 3/2011 | Thayer et al. |
| 8,019,989 B2 | 9/2011 | Bosler |
| 8,019,990 B2 | 9/2011 | Chang |
| 8,064,879 B2 | 11/2011 | Willey et al. |
| 8,074,073 B2 | 12/2011 | Gentry |
| 8,082,446 B1 | 12/2011 | Carroll |
| 8,090,949 B2 | 1/2012 | Bellur et al. |
| 8,369,522 B2 * | 2/2013 | Shirai et al. .............. 380/44 |
| 8,379,850 B1 * | 2/2013 | Bridgford et al. ........... 380/45 |
| 2001/0046292 A1 * | 11/2001 | Gligor et al. ............ 380/37 |
| 2002/0101996 A1 * | 8/2002 | Takada et al. ............ 380/277 |
| 2009/0135448 A1 * | 5/2009 | Kawara ................ 358/1.15 |
| 2009/0161865 A1 * | 6/2009 | Lee ...................... 380/38 |
| 2011/0261954 A1 * | 10/2011 | Lee ...................... 380/28 |
| 2013/0322618 A1 * | 12/2013 | Coleridge ................ 380/44 |

* cited by examiner

SYSTEM AND METHOD FOR SECURING MULTIPLE DATA SEGMENTS HAVING DIFFERENT LENGTHS USING PATTERN KEYS HAVING MULTIPLE DIFFERENT STRENGTHS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This disclosure relates to information security, and more specifically to applied cryptography.

BACKGROUND

The use of electronic data and other information has become an integral part of daily life. Each day, more and more emails, electronic documents, personal information and other forms of electronic data are transmitted throughout the world by businesses and individuals alike. Accordingly, the need to secure such data from unauthorized use and viewing has also increased Cryptography is the art and science of preparing, transmitting and reading messages in a form intended to prevent the message from being read by those not privy to secrets associated with the form. Cryptography is practiced in and widely appreciated for a wide array of applications, including gaming, computer security, healthcare information security, banking information security, military communications, mathematics, intellectual property protection and many others.

Public key cryptography provides the benefit of using a pair of related keys, including a private key that is typically a closely held secret, and a corresponding public key which may be widely revealed.

Public key digital signature schemes include methods for signing and verifying digital signatures. The signing method creates a data string called a "signature" that is associated with a digital message to bind the message to the signing entity's private key. The private key is associated with a corresponding public key, which the recipient of the message uses with a verification method to verify that the received message was, in fact, signed using the associated private key.

A public key encryption scheme includes methods for encrypting and decrypting plaintext into messages, in which a message encrypted with a party's public key can only be decrypted using the associated private key.

In the past, such prior art cryptography techniques encrypted data to make the data difficult, if not impossible, to decrypt. Such techniques were designed to prevent unauthorized review and/or use of the data by third parties. While such prior art cryptography techniques can, in fact, be very difficult to attack and bypass, such techniques remain vulnerable to attacks for several reasons.

Many prior art cryptography techniques use only a single data block or segment length when encrypting the data. Accordingly, a discernible pattern can be detected and such patterns aid in attacking and bypassing the benefits associated with using such cryptographic techniques. Still further, many prior art cryptography techniques use only a single key to encode all of the data. Accordingly, the use of a single key applied to all blocks or segments of data similarly provides the basis for finding a pattern that can be used to attack such cryptographic techniques.

Accordingly, there has been a long felt need for a new, improved and more robust cryptographic technique that can defeat well-known attacks on cryptographic methodologies. The currently disclosed technology readily satisfies this and other needs.

SUMMARY

Briefly, and in general terms, the disclosure is directed towards information security and establishing data integrity and non-repudiation. More particularly, the disclosure is directed towards securing data that is accomplished using multiple and variable data segment sizes or lengths. Still further, the disclosure is directed to securing data through the use of multiple pattern keys, each key having a different key strength and each key applied to one or more, but not all of the multiple data segments. The sequence for applying various pattern keys to the multiple data segments is identified by a key pattern. This results in a multi-standard, multi-segment paradigm.

In another embodiment, when a Public Key Infrastructure (PKI) paradigm is employed, the length of the data segment is determined based upon the PKI pattern key that is used. In this embodiment, various pattern key strengths are used (i.e., length of the pattern key) and the data segment length is determined in accordance with the PKI paradigm. A key pattern identifies the sequence that each pattern key is applied to each data segment.

In another embodiment, when a non-PKI pattern key is used, the length of the data segment is determined by a random number generated by a Random Number Generator, or other known means. The number indicates the length of the data segment. Thereafter, the pattern key is used to encrypt each data segment. Each such pattern key can have a different key strength from any other pattern key and each data segment length can vary independent of the pattern key lengths. A key pattern identifies the sequence that each pattern key is applied to each data segment. In addition, any cryptographic paradigm may be used in this embodiment.

In still another embodiment, a combination of the PKI paradigm determined data segment lengths and the random number data segment lengths may be used together in the cryptographic process. A key pattern identifies the sequence that each pattern key is applied to each data segment. Again, one or more cryptographic paradigms may be used herein.

In another embodiment, before the pattern keys are applied to the multiple data segments, all the plaintext data is first encrypted using an agreed upon password and cryptographic paradigm.

In still another embodiment, a plurality of cryptographic paradigms is used in combination so that pattern keys of different cryptographic paradigms can be applied to data segments of differing lengths.

Still further, another embodiment is directed to a system for securing data. The system includes a processor, a memory and a Random Number Generator (RNG). Using the processor, multiple pattern keys are applied to multiple data segments, in accordance with a key pattern, the key pattern identifies the sequence in which the keys are applied to encrypt the data segments. Both the pattern keys and the data segments are of varying lengths. The length of the data segment is defined either by the PKI pattern key itself or using a random number generated by the RNG for non-PKI pattern keys. As a result, the system generates a secure, encrypted message from the plaintext data as a result of the application of the multi-standard, multi-segment process.

Another embodiment is directed to a system for decrypting the encrypted data to return the original plaintext data. The system includes a processor, a memory and a Random Number Generator (RNG). Using the processor, multiple pattern keys are applied to multiple data segments, in accordance with a key pattern. Both the pattern keys and the data segments are of variable lengths. The length of the data segment is defined either by the PKI pattern key itself or using the random number generated by the RNG during the encryption process. As a result of applying the proper pattern keys to the corresponding data segments, the pattern keys can be used to decrypt the message back into the plaintext form.

And in yet another embodiment, a method for decrypting the encrypted data is disclosed. Multiple pattern keys are applied to multiple data segments, in accordance with a key pattern. Both the pattern keys and the data segments are of variable lengths. The length of the data segment is defined either by the PKI pattern key itself or using the random number generated by the RNG during the encryption process. As a result of applying the proper pattern keys to the corresponding data segments, the pattern keys can be used to decrypt the message back into the plaintext form.

For each of the decryption system and method embodiments, in the event the original plaintext message was first encrypted by a password before the pattern key encryption process began, (performed to create a one time pad of the data for enhanced security) once decryption of the data segments is complete, the password is then applied to finally return the data to its original plaintext form.

Of course, one of ordinary skill in the art will appreciate that the above system and method need not be limited to any particular environment, system or cryptographic techniques. Any system and method capable of processing the data integrity and non-repudiation routines on any data, software or information may be used. Furthermore, the system and methods may transmit the authenticated data, information and/or software to any type of device, e.g., computers, networks, mobile devices. Laptops, tablets and the like.

Other features will become apparent from the following detailed description, taken in conjunction with the accompanying drawings, which illustrate by way of example, the features of the various embodiments.

DETAILED DESCRIPTION

Figure 1:
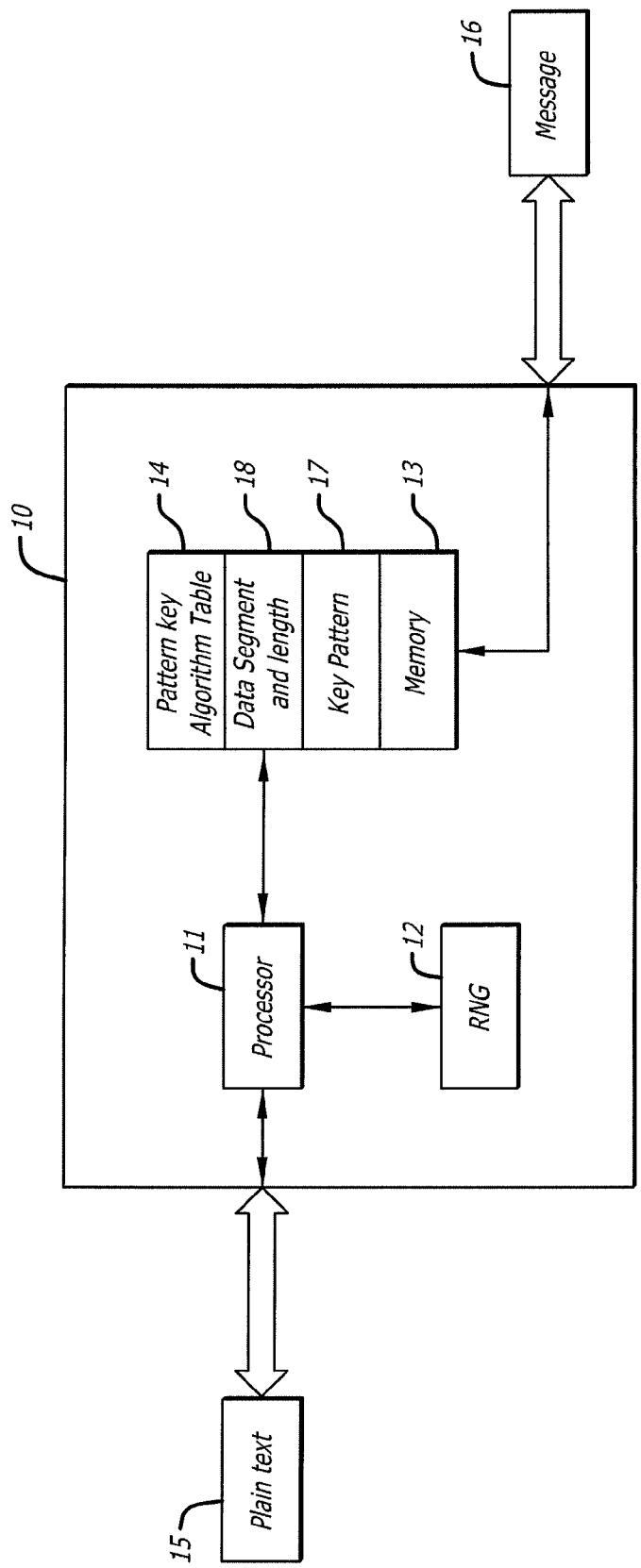
FIG. 1 is a general block diagram of an encryption/decryption system that may be used in association with a method of establishing data integrity and non-repudiation.

Protecting information security is critical in today's information intensive society. Verifying the accuracy of information to provide trustworthiness is essential. In many different environments, sensitive data and information is transmitted from one location to another. The receiving party must be able to verify the authenticity of the information and the sender must be able to rely upon the information being transmitted securely.

Accordingly, this disclosure is directed towards information security and establishing data integrity and non-repudiation. More particularly, the disclosure is directed towards securing data that is accomplished by using multiple and variable data segment lengths. Still further, the disclosure is directed to securing data through the use of multiple pattern keys, each key having a different key strength and each key applied to one or more, but not all of the varying length data segments. A key pattern is used to define and/or identify the sequence that each pattern key is applied to each data segment. It will be appreciated that the key pattern can be any form of indicia so long as the parties and the cryptographic system and method disclosed herein can use such indicia to determine the sequence of pattern key application to each data segment.

One of ordinary skill in the art will appreciate that the methods, functionality and features described herein may be embodied in whole or in part in software which operates on a standalone, server, or a distributed system and may be in the form of firmware, an application program, an applet, a plug-in, a COM object, a dynamic linked library, a script, one or more subroutines, or an operating system component or service.

Still further, one of ordinary skill in the art will appreciate that the disclosed cryptographic process may be used in the same manner as any other known cryptographic technique and applied accordingly. As used herein, "plaintext" refers generally to all information, data and any other content in its unencrypted form. As used herein, "message" is the encrypted faun of the plaintext.

In general, by way of example only and not by way of limitation, the disclosed cryptographic process will now be discussed in more detail.

Data is apportioned into segments of varying lengths. For example, 40 bits, 168 bits, 296 bits, 1960 bits, 16,296 bits, and the like. It should be appreciated that any length data segment may be used and the determination of data segment length may be done in a predetermined manner (PKI) or chosen randomly (RNG). Each data segment may be a different length or, alternatively, some, but not all data segments may be the same length as other data segments.

In accordance with a key pattern, which defines a sequence, two or more pattern keys are applied to the data segments. More particularly, pattern key 1 may be applied to data segment 1, pattern key 2 to data segment 2, pattern key 3 to data segment 3, and . . . pattern key n to data segment n. It will be appreciated that one or more pattern keys, 1-n, may be applied to one or more data segments, 1-n. In general, each pattern key, 1-n, will have its own key length or strength. For example, pattern key 1 may be 128 bits, pattern key 2 may be 256 bits, pattern key 3 may be 2048 bits, and the like. However, one of ordinary skill in the art will appreciate that any key strength (number of bits) may be used for each pattern key and, further, that one or more pattern keys may each have the same key strength.

The reason for using pattern keys of different strength is to avoid patterns in the encrypted data. For example, a key strength of 2048 bit can encode approximately 600 bytes of data. If the same key strength is used again and again, then the same segment length or size (e.g., 600 bytes) of the data is used again and again. This presents a detectable pattern of data segment length. However, when various lengths of data segments are used along with various key strength (number of bits) there is no discernible pattern. Therefore, it becomes impossible to know (1) what data segment length was used, (2) what key length or strength was used and (3) which pattern key has been applied to which data segment. This sequence of how each pattern key is applied to each data segment (key pattern) acts as an additional security feature of the disclosed embodiments.

In short, by using different key strengths on different data segment lengths, there is nothing in the data to delineate each segment (e.g., segment 1 from segment 2) or the sequence in which each pattern key was applied to each data segment. Consequently, even if a third party acquires the pattern keys used in the cryptographic process, unless the sequence of how each pattern key is applied to each data segment is known, it is not possible to determine such sequence to decrypt the information.

In a preferred embodiment, the key strength is limited to 128 bits, 256 bits, 1024 bits and 2048 bits. This is done to enhance processing times when generating the encrypted output. However, it is to be understood that any key strength may be used without departing from the scope and spirit of this disclosure.

Still further, in another embodiment, different cryptographic paradigms may be used in addition to the various data segment lengths and/or pattern key strengths. By way of example only and not by way of limitation, one pattern key may use a Public Key Infrastructure (PKI), whereas another pattern key may be Blowfish, Elliptical Curve Cryptography (ECC), Pintsov-Vanstone Signature Scheme with Partial Message Recovery (PVSSR), Advance Encryption Standard (AES), Gamal, Data Encryption standard (DES), TripleDES, Rijndael, XMX, Serpent, Blowfish, Twofish, any combination of these standards, or the like. In other words, the disclosed cryptographic technique is not limited to the use of any one specific encryption paradigm. This provides enhanced flexibility and security capabilities.

Referring now to the drawings, wherein like references numerals denote like or corresponding parts throughout the drawings, and more particularly to FIG. 1, there is shown a general system 10 configured for use in performing the disclosed cryptographic process. The system 10 includes a processor 11 for operating on the data (e.g., encryption/decryption using various algorithms), a Random Number Generator (RNG) 12 for generating a random number (if applicable) for determining the length of a data segment, and a memory 13 for storing a pattern key algorithm table 14, the key pattern 17, and the data segment and its length 18, if necessary. Specifically, the memory 13 includes a table of pattern key algorithms 14 to be applied to the various data segments. This pattern key algorithm table 14 is determined and configured in advance by the parties before the cryptographic technology disclosed herein is first used. The table 14 includes the particular algorithms for each configuration of the system 10. That is, the pattern key algorithm table 14 includes the specific algorithm protocols and where in the algorithm table such algorithm(s) are located and called. Using the sequence defined by the key pattern 17, the processor 10 is configured to communicate with the memory 13 to access the one or more pattern key algorithms stored in the pattern key algorithm table 14. The processor 10 then applies each of the pattern keys to each of the various data segments to encrypt the data segments with the appropriate algorithm protocol associated with the pattern key.

As is discussed in greater detail below, the system 10 also may use the processor 11 to determine the length of the data segments 18. When a pattern key is applied, the processor first determines whether a PKI pattern key or non-PKI pattern key is active. If a non-PKI pattern key is active, then the processor 11 accesses the RNG 12 to generate a random number. This random number is used to set the length of the active data segment 18. This data segment length 18 is then stored in memory 13 so that it may be accessed later during the decryption process. If a PKI pattern key is active, then the length of the data segment 18 is predetermined by the PKI paradigm and need not be stored in the memory 13.

In summary, therefore, plaintext 15 is input into the system 10. Plaintext 15 may be input into the system 10 through any well-known mechanism or process. The processor 11 accesses the plaintext 15 and applies the cryptographic technique disclosed above to generate an encrypted version of the plaintext, i.e., a message 16. The message 16 may then be sent to one or more authorized recipients. The recipient, upon receipt of the encrypted message 16, can properly decrypt the message (as discussed in detail below) to return to the usable plaintext 15 form using the recipient's system 10.

One of ordinary skill in the art will appreciate that not all systems have all these components and may have other components in addition to, or in lieu of, those components mentioned here. Furthermore, while these components are viewed and described separately, various components may be integrated into a single unit in some embodiments.

By way of example and not by way of limitation, Table 1 illustrates one example of a pattern key algorithm table 14.

TABLE 1

Pattern Key Algorithms

| Index | Standard | Key Length Bits | Password Byte Length |
|---|---|---|---|
| 1 | PKI | 384 | |
| 2 | PKI | 512 | |
| 3 | TripleDES | | 225 |
| 4 | PKI | 1024 | |
| 5 | AES | | 98 |
| 6 | PKI | 2048 | |
| 7 | Rijndael | | 90 |
| 8 | PKI | 4096 | |
| 9 | PKI | 8192 | |

As illustrated in Table 1, the pattern keys can be either a PKI pattern key or a non-PKI pattern key (i.e., using a non-PKI cryptographic paradigm). When a Public Key Infrastructure (PKI) paradigm is used by the system, the key strength (length or size of the key) of the PKI pattern key determines the size of the data segment to which the PKI pattern key is applied. This is a specific requirement of the PKI paradigm. Generally, as shown in Table 2, the data segment length is determined by dividing the key length (listed in bits) by 8 and then subtracting 11. This provides the length of the data segment in bytes. The PKI pattern key is then applied to this data segment, as discussed in more detail below.

TABLE 2

Given a PKI pattern key, the following Table displays relevant data segment lengths:

| Key Length (in bits) | Segment Length (Key length/8) − 11 | Segment Lengths (in bits) |
|---|---|---|
| 128 | 5 | 40 |
| 256 | 21 | 168 |
| 384 | 37 | 296 |
| 512 | 53 | 424 |
| 1024 | 117 | 936 |
| 2048 | 245 | 1960 |
| 4096 | 501 | 4008 |

TABLE 2-continued

Given a PKI pattern key, the following Table displays
relevant data segment lengths:

| Key Length (in bits) | Segment Length (Key length/8) − 11 | Segment Lengths (in bits) |
|---|---|---|
| 8192 | 1013 | 5104 |
| 16384 | 2037 | 16296 |

When other algorithms (non-PKI cryptographic paradigms) are used, the length of the data segments 18 are not limited or controlled by the pattern keys. In this embodiment, the length of the data segment 18 can be randomly chosen using a Random Number Generator (RNG) 12. The processor 11 takes a randomly generated number and creates a data segment 18 having a length corresponding to the random number. Generally, the length of the data segment 18 using the RNG 12 will be in the range of 96-512 bytes. However, it will be appreciated that any length data segment may be used herein. Furthermore, it will be appreciated that other methods may be used to determine the length of the data segment, in addition to or in lieu of the RNG 12 generating a random number. By way of example only, data segment lengths may be entered manually by a party, tied to another random process, agreed to in advance by the parties when the system is configured, or through use of another set pattern, or the like. All that is necessary is that the length of such data segment 18 is stored in memory 13 along with the data segment so that it may later be retrieve for proper decryption to occur. Once the data segment length 18 is determined in this embodiment, the pattern key algorithm is applied to the data segment to encrypt the data segment.

Accordingly, multiple data segments of different lengths are used with pattern keys of different strength (bit lengths). In addition, this technique enables the use of more than one cryptographic paradigm to be applied to one or more of the data segments and such application may be performed in any sequence. By way of example and not by way of limitation, each pattern key may use any of the PKI, PVSSR, ECC, AES, DES, TripleDES, Gamal, Rijndael, Twofish, Blowfish, XMX, Serpent, any combination thereof, or the like. In other words, the disclosed cryptographic technique is not limited to application of any one specific encryption paradigm or protocol.

In an alternative embodiment, all the Plaintext data is first encrypted using a single password, or other cryptographic paradigm. Thereafter, the process continues and applies the multiple pattern keys to the multiple data segments, as previously discussed. In this way, the system provides a One Time Pad to the encryption process. This One Time Pad ("OTP") is performed to ensure that "holes" cannot be derived in any of the data in the event a given data segment is decrypted or broken by an unauthorized attack. By first encrypting all the data, if a hole is subsequently discovered by an attacker, it will not be possible for the attacker to determine the existence of such a hole. Without this step, if a hole is found in a broken data segment, the attacker may merely move through the data byte by byte until a subsequent hole in the data is located. Although a painstaking process, moving through the data in this manner may aid the attacker in his illicit attempt to decrypt the data. By first encrypting the data before applying the cryptographic techniques of the current disclosure, the attacker will not know that a hole has been located in the first instance.

As discussed above, which pattern keys are applied to which data segments is determined by the key pattern. This key pattern is agreed to amongst the parties using the cryptographic process in advance of using the cryptographic process. Using pattern keys, the key pattern defines which algorithm in the pattern key algorithm table is applied to each data segment. In addition, the key pattern is used to inform the recipient of the encrypted message whether the entire Plaintext data has first been encrypted, and if so, which algorithm was used to create the password.

By way of example, and not by way of limitation, a sample key pattern is 3.1254. This number represents the sequence of how each pattern key (and its associated cryptographic algorithm) is applied to each data segment during the encryption process. The first number (or any other symbol, indicia or phrase) located in front of the "." indicates that the entire plaintext data is first encrypted. In this example, the "3" digit indicates that the plaintext is first encrypted using algorithm 3 from the pattern key algorithm table to create a password. Thereafter, the "1" following the "." indicates that algorithm 1 (e.g., the first algorithm stored in the table and called from that location) is used to encrypt the first data segment. Next, the "2" indicates that algorithm 2 (e.g., the second algorithm in the pattern key algorithm table and called from that location) is used to encrypt the next data segment. This continues until all the designated algorithms have been applied to the multiple data segments. At the end of the key pattern, e.g., digit "4" in the above example, the cycle repeats by returning to the beginning digit following the "." of the key pattern until all data segments have been processed. In a preferred embodiment, at least five pattern keys are used; however, one of ordinary skill in the art will appreciate that any number of keys 2-n may be used herein.

Once all the plaintext has been encrypted, the encrypted plaintext (message) is sent to an authorized recipient using any well-known technique, including, but not limited to email, network transmission, wireless transmission, portable data storage, or the like. Since the pattern key algorithm table and the key pattern was previously configured by the parties before the application of the cryptographic process, the receiving party simply uses the key pattern to apply the decryption protocol for each pattern key algorithm as it has been applied to each data segment during encryption. It is noted that in some embodiments, the key pattern also may be sent to the recipient, but generally this is not done to best preserve the sequence of the encryption process. Finally, if the plaintext data was initially encrypted with a password before the pattern key cryptography began, the first number located before the "." will so indicate to the receiving party so that a final decryption process may be completed to retrieve the original, unencrypted plaintext.

Figure 2:
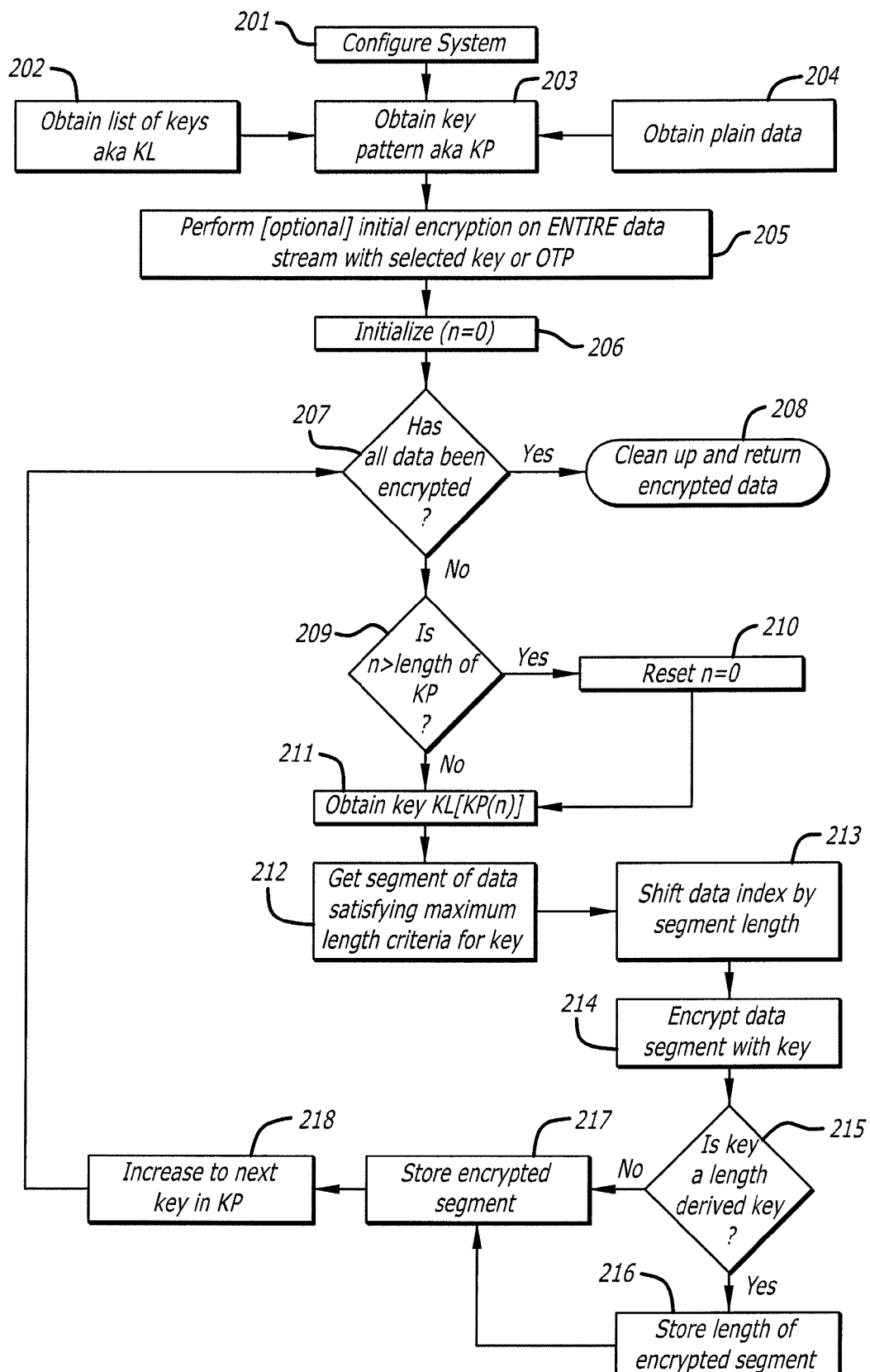
FIG. 2 is a logic flow diagram of a method of establishing data integrity and non-repudiation using an encryption process.

Referring again to the drawings, and more particularly to FIG. 2, there is shown one embodiment of the encryption process.

Beginning at Step 201, the parties to the cryptographic transaction configure the system 10. At Step 202, the parties store in the memory 13 (referring to FIG. 1), and more particularly in the pattern key algorithm table 14, the appropriate keys (and their associated cryptographic paradigms) that will be used in the encryption process. Next, at Step 203, the key pattern is input to the system 10. At Step 204, the plaintext is input to the system 10. It will be appreciated that the pattern key algorithms, the plaintext, and the key pattern can be input to the system 10 through any known input device, including but not limited to a keyboard that is in communication with the system 10, any method of data transmission, e.g., network, wireless, or optical, use of a data file with an input port, any portable data storage device, or the like.

After all the pattern keys, key pattern and plaintext are input into the system 10, the processor 11 operates upon the plaintext data to encrypt the plaintext into an encrypted message.

Optionally, at Step 205, all the plaintext may first be encrypted with a password. The password is determined by the parties during the configuration phase of the system 10. As discussed above, this Step 205 is used to prevent an attacker from discovering any useful information should a broken segment be discovered by the attacker. Thereafter, the process continues to Step 206 where the system 10 is initialized. The variable "n" is reset to zero. The variable, n, corresponds to digit placement within the key pattern. By resetting n to zero, the encryption process begins at the start of the key pattern, i.e., the first digit of the key pattern.

At Step 207, the process determines whether all the data segments have been encrypted. If true is returned, the process continues at Step 208 and the encrypted data is stored in the memory 13 and/or output as a message. The message may then be transmitted to appropriate recipients of the message for subsequent decryption of the message and use of the resultant plaintext.

If some data remains to be encrypted, then the process continues and cycles through the data segments in a round robin fashion. At Step 209, the process determines if "n" is greater than the length of the key pattern. If n is greater than the length of the key pattern, then "n" is reset to zero, Step 210. This Step 210 is performed to enable the key pattern to be repeated as many times as is necessary to encrypt all the data. If n is not greater than the length of the key pattern, then at Step 211, the process acquires the appropriate pattern key from the list of pattern keys corresponding to the active key pattern number.

Once the selected pattern key is acquired, the process continues to Step 212 to obtain the appropriate data segment length corresponding to the selected key criteria. Recall, when using PKI, the key length of the PKI pattern key determines the length of the data segment. However, if the PKI paradigm is not being used with the active pattern key, then the length of the data segment is determined by a random number generated by an RNG 12.

Following Step 212, the process continues at Step 213 to shift the data index by the length of the current data segment. This Step 213 captures the next appropriate data segment (of a specified length) for encryption with the active pattern key. Then, at Step 214, the data segment is encrypted using the active pattern key.

Thereafter, the process continues at Step 215 where the process determines whether the pattern key is a length determined key. This Step 215 is performed when the RNG has generated the random number that determines the length of the data segment. The random length of the data segment must be included in the data stream or else the recipient cannot properly decrypt the message. The recipient would not be able to determine the length of the data segment and this would destroy the continuity of the data set. Therefore, if Step 215 returns true, then the process continues to Step 216 and the length of the encrypted data segment is stored in the data stream and the memory 13. Along with this data segment length, the encrypted data segment is then stored in memory, Step 217. If Step 215 returns false, i.e., the key is not a length derived key, then only the encrypted data segment is stored in memory, Step 217. This is because the PKI pattern key determines the length of the data segment, as previously discussed.

After storing the encrypted data segment, n is incremented so that the next pattern key in the key pattern can be obtained, Step 218. The cryptographic process continues to cycle until all the data has been encrypted by returning to Step 207.

Once an authorized recipient receives the encrypted message, the message must be decrypted to return the data to its original plaintext form. The recipient uses a system 10, such as that described in FIG. 1 above, to perform the decryption process. However, one of ordinary skill in the art will appreciate that variations of the system 10 may be used by each of the parties herein to encrypt and/or decrypt the information and, accordingly, none of the parties are required to use the same system as any other party.

By way of example only, and referring back to FIG. 1, there is shown one embodiment of the system 10 used to decrypt the message 16. The message 16 is input to system 10 and stored in the memory 13. Thereafter, the processor 11 accesses each data segment of the message from the memory 13 to decrypt the message by applying the appropriate pattern key, as defined by the key pattern 17. Recall, each data segment has a segment length 18 that may vary one from the other. The processor 11 accesses the pattern key for each data segment to determine the length of each data segment. If a PKI pattern key was used during encryption, the processor 11 knows the length of the data segment. In the event the data segment was encrypted with a non-PKI pattern key, the processor 11 must then access the memory 13 to acquire the determined length of this particular data segment. Recall that during encryption of the data segment, when a non-PKI pattern key was used, an RNG 12 generated a random number and this random number was used to determine the length of the data segment 18. Once the processor 11 has this information, the processor proceeds to decrypt the data segment using the proper data segment length 18 and proper pattern key. Continuing, the processor 11 accesses the next data segment and applies the next appropriate pattern key (in accordance with the key pattern 17). The system 10 continues this process until all the data segments have been properly decrypted using the pattern keys.

If the event the plaintext data was first encrypted by a password before the pattern key encryption process began, the processor 11 will access the key pattern from memory 13 to determine the proper password or cryptographic paradigm to apply to the data segments to complete the decryption process. At this point, the system 10 will have decrypted the message 16 to return to the original plaintext 15.

Figure 3:
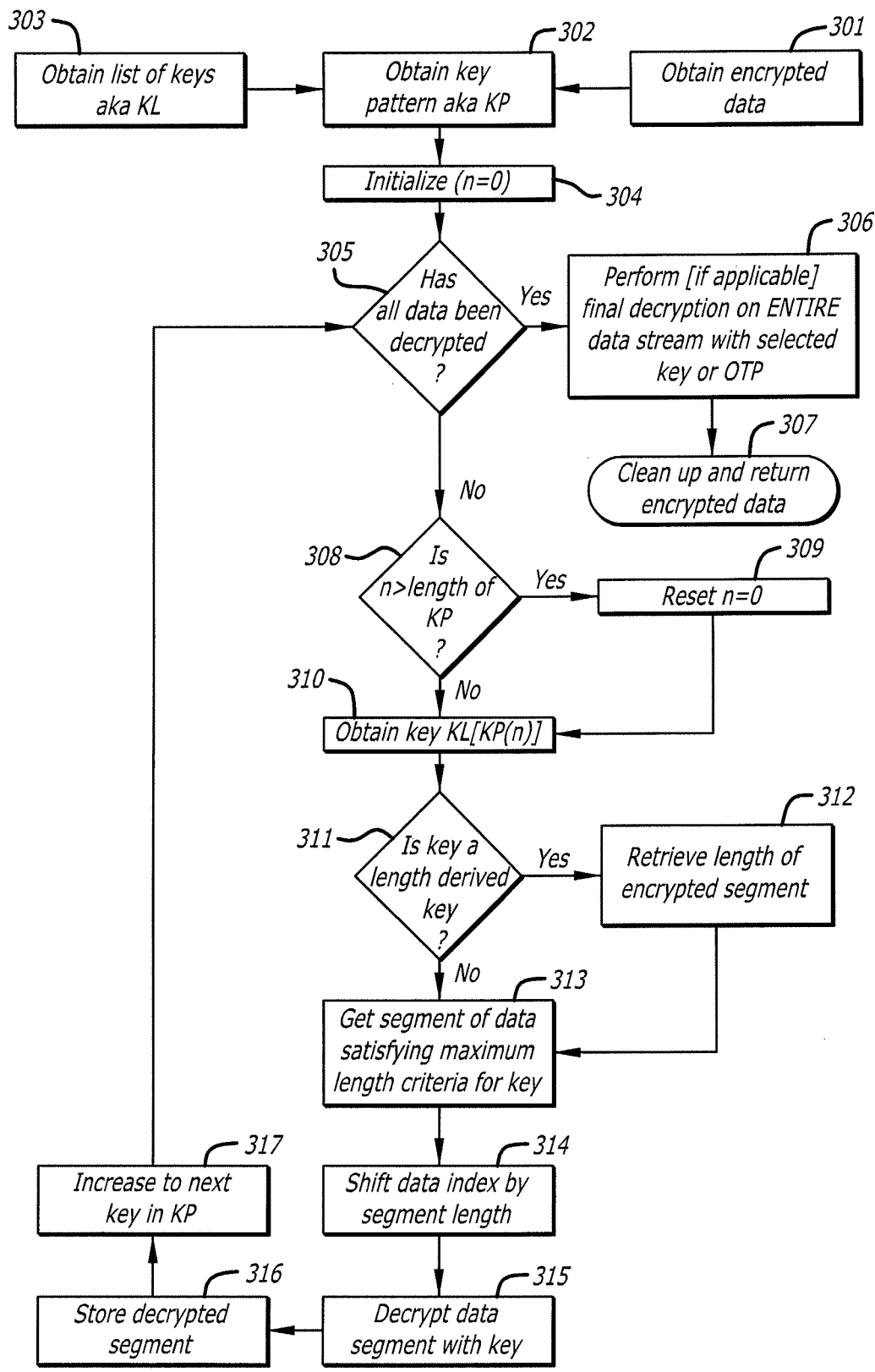
FIG. 3 is a logic flow diagram of a method of establishing data integrity and non-repudiation using a decryption process.

More particularly, and referring now to FIG. 3, there is shown another embodiment of a decryption process. Beginning at Step 301, the process first obtains the encrypted message. This message is input into the system 10 (referring to FIG. 1) using any well-known technique, including, but not limited to network transmissions, email, wireless transmission, portable data storage, and the like. Thereafter, the processor 11 operates on the message to apply the proper key pattern and associated decryption paradigms (pattern keys) to the message. The pattern keys and the sequence of their application to the data segments, i.e., the key pattern, are acquired at Steps 302 and 303, respectively. Recall, that the pattern keys and the key pattern have previously been determined and agreed to by the parties to the transaction when the system 10 was initially configured for use with the disclosed cryptographic technique. The process continues by initializing the system 10 and setting n to zero, Step 304. By setting n to zero, the process can begin with the first digit of the key pattern.

The process continues at Step 305 to determine if all the data has been decrypted. If Step 305 returns true, then, at Step 306, if the original plaintext data has been first encrypted as a whole (Step 205 in FIG. 2) then the appropriate decryption process is applied to return the message to its original plaintext form. The recipient may then use the plaintext according to his/her needs after any required clean-up of the data, Step 307. If the optional OTP was not performed (again Step 205 in FIG. 2), then Step 306 is omitted. If Step 305 returns false, then the process continues to Step 308 to determine whether or not the end of the key pattern has been reached. If n is greater than the length of the key pattern, then n is reset to zero to enable the key pattern to repeat from the beginning of the key pattern, step 309. If n is less than the length of the key pattern, then the process continues at Step 310.

At Step 310, the process acquires the appropriate pattern key from the list of pattern keys corresponding to the active pattern key digit. Again, these pattern keys are stored in the pattern key algorithm memory 14 of the memory 13. Next, the process at Step 311 determines if this is a PKI pattern key or a non-PKI pattern key. If a non-PKI pattern key is active, then the process must first obtain the length of the data segment that was determined by the RNG during the encryption process. As such, the process continues to Step 312 to retrieve the length of the encrypted data segment. If, however, in Step 311 the pattern key is not a length derived key using the RNG, then the appropriate length of the data segment for use with the active PKI pattern key is already known based upon the PKI paradigm.

At Step 313, the appropriate length of the encrypted data segment is acquired, whether it is determined by the RNG or the PKI paradigm. The data index is then shifted by the appropriate data segment length in Step 314. Thereafter, the appropriate key is applied to the corresponding encrypted data segment to decrypt the data segment, Step 315.

The process then continues at Step 316 so that the decrypted data segment is stored in memory. At Step 317, n is incremented to the next digit of the key pattern for selecting the next appropriate pattern key. Consequently, the decryption process continues to cycle in a round robin fashion (i.e., back to Step 305) until all the data has been decrypted and returned to the original plaintext form.

Continuing, by way of example only, and not by way of limitation, the following is one implementation of the disclosed cryptographic process, as applied to the following plaintext:

Alice has a secret family recipe (plaintext) that she wishes to send to Bob. Using the disclosed cryptographic process, Alice encrypts the recipe (creating a message). In order for this to process to operate properly, Alice and Bob must each have access to the same set of pattern keys, and the sequence the pattern keys are used, key pattern.

For the purposes of this example only, and not by way of limitation, the following pattern keys are used:

1 384 bit PKI
2 512 bit PKI
3 TripleDES based password from 64 to 256 characters long
4 1024 bit PKI
5 AES based password from 96 to 128 characters long
6 2048 bit PKI
7 Rijndael based password from 64 to 256 characters long
8 4096 bit PKI
9 8192 bit PKI Alice and Bob have agreed to initially obfuscate the data with a One Time Pad (OTP) based on the phrase 'testphrase' using the _____ cryptographic paradigm. They have also agreed to use a key pattern of 12345 (any pattern here would work as long as it is based on the agreed upon key set). The following pattern is thus used to encrypt/decrypt the data segments:

1 For encryption, (since they agree to an initial pass) the entire data stream is encrypted with an OTP based on their agreed phrase using _____ paradigm.
2 The first data segment uses the 384 bit PKI to encrypt a data segment that is 37 bytes long (the length of the data segment being determined by the PKI key requirements, as discussed above).
3 The second data segment uses the 384 bit PKI 512 to encrypt the next data segment that is also 37 bytes long (again, as determined by the PKI key requirements).
4 The third data segment uses the password data that is n bytes long (as determined by the random number generator, as discussed above)
5 The fourth data segment uses the 1024 bit PKI to encrypt the data segment that is 37 bytes long (as determined by the PKI key requirements)
6 The fifth data segment uses the password data n bytes long (as determined by the random number generator)
7 At this point in the process, the pattern key is exhausted and the process returns to the first key and in a round robin fashion the process cycles again until all the data is encrypted or decrypted.
8 For decryption, (since Alice and Bob agree to an initial OTP pass through the plaintext) the entire data stream is decrypted with the OTP based on Alice and Bob's agreed to phrase and the associated cryptographic paradigm.

Applying the above to the recipe (plaintext), the following resultant encrypted message is created, as illustrated in Table 3:

TABLE 3

---
Encryption
---

---
Step 0 - Initial data
---

Cheeseburger Mashed Potato Pie

Ingredients

Slow: 4 large skinned and boiled potatoes

Fast: 1 (4 7/8 ounce) packet mashed potatoes

1/4-1/2 cup butter

Both

1/2 lb. ground beef, 2 cups shredded/sliced cheese

Directions

1 Fry the beef in a nonstick pan, and when finished, drain off the fat and set it aside.

2 Prepare mashed potatoes, add milk and whip until creamy.

3 In medium baking dish, layer potatoes, beef, 1/2 of cheese, potatoes, rest of cheese on top.

4 Place in 350°F oven, bake until cheese is melted and part of the potatoes golden brown.

5 Let it set for five minutes and then serve.

---

---

Segment processing

---

------ Standard for this segment: PKI at index 0 ------

Segment size in (predetermined due to key strength): 37

Segment data (plain text):

[[[

Cheeseburger Mashed Potato Pie ing

]]]

Segment size out: 48

Segment data (encrypted):

[[[

196f989dbbbda49be77d3e7ee2f9e1b28878b10809796ee9ae2bba9fada0368e566efef827216c4b094b8b2ebdbb42e5

]]]

------ Standard for this segment: PKI at index 37 ------

Segment size in (predetermined due to key strength): 53

Segment data (plain text):

[[[

Ingredients

Slow:   4 large skinned and boiled potatoes

]]]

Segment size out: 64

Segment data (encrypted):

[[[

38ce64492935fff489c286a43de9ebfd274ee3883ff6e3df299a6fa3f3bb1563e6c3ec2a698bd2ef3bf34d946

1987bad725574f132200e38ff81c04400f11c4b

]]]

------ Standard for this segment: TripleDES at index 90 ------

Segment size in (based on random number): 78

Segment data (plain text):

[[[

Fast:   1 (4 7/8 ounce) packet mashed potatoes
        1/4-1/2 cup butter

Both

]]]

Segment size out: 112

Segment data (encrypted):

[[[

445fa247af13a53590767babef49c02d23cafeb364da2289b61a2f6884b546dca5ac38f779f52ae6eb9ddf60 a2dd4ea16aefab4747dcff40172c2dc1e48fc97b09f3205f6011c8d28b0b9f44649913143acf7680f9ef6055f 3eb419886bad1ffe6358d0e420272b89a44f9d7a5005d9e

]]]

------ Standard for this segment: PKI at index 168 ------

Segment size in (predetermined due to key strength): 117

Segment data (plain text):

[[[

1/2 lb. ground beef, 2 cups shredded/sliced cheese

Directions

1 Fry the beef in a nonstick pan, and when finished

]]]

Segment size out: 128

Segment data (encrypted):

[[[

241173c75d38181309a6ac6e6cecd709355a3e70e7ff23fd8efd0ef2cdc94aec5b40e56e576f1ca2c66f30a1

0fec63f3cd7fd4c66118593f5209eefc6e5feda3b103b856d51cfbcb44871fc747cca3c15558bfd5a21c9e9ae f7a12bcf5df3efee22b89b72af1e740c944673d70d91196ba7365455ea68b31eed9e250019c70af

]]]

------ Standard for this segment: AES at index 285 ------

Segment size in (based on random number): 180

Segment data (plain text):

[[[

, drain off the fat and set it aside.

2 Prepare mashed potatoes, add milk and whip until creamy.

3 In medium baking dish, layer potatoes, beef, 1/2 of cheese, potatoes, res

]]]

Segment size out: 240

Segment data (encrypted):

[[[ ce50dc5abebbde9f4563f611a22afac7a7e5182ca11644f01eb5cf0a0f75dc72ad0496ad923d9641197f58fc ed8d0bac9175b4b77029731468ac3a6ea198053dc1a154b0fb18a9828fea1968c38749de5a96be515f437f fe4c7a42b96f95aa85ce68db22ec2b50951f227619e310aee8b41cd8b4bf4133c2bf8c9cbecd9710ed9ae24 f87c12c59639cbbb58beecac10da47a3004d9ba505ae7b4dff225de731c9cfbfd12f24bf6c091ef3fe77b276
1098914fbbe5f4cde2b61b770a42bdff1a626ac43ec44b4c1a2749944e8fe87ec2c0b4a16e7dbc12a100a7c
27d647add5995196da3cdb5573590a09936d615e38a0

]]]

------ Standard for this segment: PKI at index 465 ------

Segment size in (predetermined due to key strength): 37

Segment data (plain text):

[[[ t of cheese on top.

4 Place in 350

]]]

Segment size out: 48

Segment data (encrypted):

[[[

445bbb586c3c6bb5f31142d90875eb8bcd9d84cdf8438f499b3bc49cc7a86379ac5dc6507a5e2ecb001271
d1d92cec5f

]]]

------ Standard for this segment: PKI at index 502 ------

Segment size in (predetermined due to key strength): 53

Segment data (plain text):

[[[

°F oven, bake until cheese is melted and part of the

]]]

Segment size out: 64

Segment data (encrypted):

[[[

062d1cd5147173ad87492cbc55ba1b7501fae200806e69516b91b4f0c9db034b9b5e387d119d541819177
f82e1204671f7361aeae2a1da7c22336f551fb5a09e

]]]

------ Standard for this segment: TripleDES at index 555 ------

Segment size in (based on random number): 71

Segment data (plain text):

[[[ potatoes golden brown.

5 Let it set for five minutes and then serve

]]]

Segment size out: 104

Segment data (encrypted):

[[[ eaf81122033041007684dbe206b209548db9a93d4ba3e7a4558da4ff8bdc25d4cf30421f23fe0795d8ed50
2675dfea6d697d034f9501124ccb53f5f96c8617c301b3b85fb4479002e93b1902ace9e60d274b1eab7816
5321666dfaf43368da507304231c3104de26

]]]

------ Standard for this segment: PKI at index 626 ------

Segment size (based on remaining data): 4

Segment data (plain text):

[[[

.

]]]

Segment size out: 128

Segment data (encrypted):

[[[

2f76cc7b219f3b71681b4c1ec50827721d1c2a859dd3a5c4cbf1dfc3688b181e9cac2006d889c8f57f32204c
83bfa61603e138935d7c4d613304c0240beca3941d3288930f7e6efdd1d21545cf7c517c747311be9763fe
169ef269706757717fd3169d4ea05470f5178bf8010ccee3364ab8ac7416df10f3147d41649ada6113

]]]

---

Step n - Final view

---

196f989dbbbda49be77d3e7ee2f9e1b28878b10809796ee9ae2bba9fada0368e566efef827216c4b094b8b 2ebdbb42e538ce64492935fff489c286a43de9ebfd274ee3883ff6e3df299a6fa3f3bb1563e6c3ec2a698bd2 ef3bf34d9461987bad725574f132200e38ff81c04400f11c4b70000000445fa247af13a53590767babef49c0

2d23cafeb364da2289b61a2f6884b546dca5ac38f779f52ae6eb9ddf60a2dd4ea16aefab4747dcff40172c2d c1e48fc97b09f3205f6011c8d28b0b9f44649913143acf7680f9ef6055f3eb419886bad1ffe6358d0e420272 b89a44f9d7a5005d9e241173c75d38181309a6ac6e6cecd709355a3e70e7ff23fd8efd0ef2cdc94aec5b40e 56e576f1ca2c66f30a10fec63f3cd7fd4c66118593f5209eefc6e5feda3b103b856d51cfbcb44871fc747cca3 c15558bfd5a21c9e9aef7a12bcf5df3efee22b89b72af1e740c944673d70d91196ba7365455ea68b31eed9e 250019c70aff0000000ce50dc5abebbde9f4563f611a22afac7a7e5182ca11644f01eb5cf0a0f75dc72ad049

6ad923d9641197f58fced8d0bac9175b4b77029731468ac3a6ea198053dc1a154b0fb18a9828fea1968c38

749de5a96be515f437ffe4c7a42b96f95aa85ce68db22ec2b50951f227619e310aee8b41cd8b4bf4133c2bf 8c9cbecd9710ed9ae24f87c12c59639cbbb58beecac10da47a3004d9ba505ae7b4dff225de731c9cfbfd12f 24bf6c091ef3fe77b2761098914fbbe5f4cde2b61b770a42bdff1a626ac43ec44b4c1a2749944e8fe87ec2c0 b4a16e7dbc12a100a7c27d647add5995196da3cdb5573590a09936d615e38a0445bbb586c3c6bb5f31142 d90875eb8bcd9d84cdf8438f499b3bc49cc7a86379ac5dc6507a5e2ecb001271d1d92cec5f062d1cd51471

73ad87492cbc55ba1b7501fae200806e69516b91b4f0c9db034b9b5e387d119d541819177f82e1204671f 7361aeae2a1da7c22336f551fb5a09e68000000eaf81122033041007684dbe206b209548db9a93d4ba3e7 a4558da4ff8bdc25d4cf30421f23fe0795d8ed502675dfea6d697d034f9501124ccb53f5f96c8617c301b3b8

5fb4479002e93b1902ace9e60d274b1eab78165321666dfaf43368da507304231c3104de262f76cc7b219f 3b71681b4c1ec50827721d1c2a859dd3a5c4cbf1dfc3688b181e9cac2006d889c8f57f32204c83bfa61603e 138935d7c4d613304c0240beca3941d3288930f7e6efdd1d21545cf7c517c747311be9763fe169ef269706

757717fd3169d4ea05470f5178bf8010ccee3364ab8ac7416df10f3147d41649ada6113

---

Similarly, Bob upon receipt of the encrypted message can decrypt the message into its original plaintext form, using the information from above. By doing so, the following output is created:

---

Decryption

---

---

Step 0 - Initial data
---

196f989dbbbda49be77d3e7ee2f9e1b28878b10809796ee9ae2bba9fada0368e566efef827216c4b094b8b
2ebdbb42e538ce64492935fff489c286a43de9ebfd274ee3883ff6e3df299a6fa3f3bb1563e6c3ec2a698bd2
ef3bf34d9461987bad725574f132200e38ff81c04400f11c4b70000000445fa247af13a53590767babef49c0
2d23cafeb364da2289b61a2f6884b546dca5ac38f779f52ae6eb9ddf60a2dd4ea16aefab4747dcff40172c2d
c1e48fc97b09f3205f6011c8d28b0b9f44649913143acf7680f9ef6055f3eb419886bad1ffe6358d0e420272
b89a44f9d7a5005d9e241173c75d38181309a6ac6e6cecd709355a3e70e7ff23fd8efd0ef2cdc94aec5b40e
56e576f1ca2c66f30a10fec63f3cd7fd4c66118593f5209eefc6e5feda3b103b856d51cfbcb44871fc747cca3
c15558bfd5a21c9e9aef7a12bcf5df3efee22b89b72af1e740c944673d70d91196ba7365455ea68b31eed9e
250019c70aff0000000ce50dc5abebbde9f4563f611a22afac7a7e5182ca11644f01eb5cf0a0f75dc72ad049
6ad923d9641197f58fced8d0bac9175b4b77029731468ac3a6ea198053dc1a154b0fb18a9828fea1968c38
749de5a96be515f437ffe4c7a42b96f95aa85ce68db22ec2b50951f227619e310aee8b41cd8b4bf4133c2bf
8c9cbecd9710ed9ae24f87c12c59639cbbb58beecac10da47a3004d9ba505ae7b4dff225de731c9cfbfd12f
24bf6c091ef3fe77b2761098914fbbe5f4cde2b61b770a42bdff1a626ac43ec44b4c1a2749944e8fe87ec2c0
b4a16e7dbc12a100a7c27d647add5995196da3cdb5573590a09936d615e38a0445bbb586c3c6bb5f31142
d90875eb8bcd9d84cdf8438f499b3bc49cc7a86379ac5dc6507a5e2ecb001271d1d92cec5f062d1cd51471
73ad87492cbc55ba1b7501fae200806e69516b91b4f0c9db034b9b5e387d119d541819177f82e1204671f
7361aeae2a1da7c22336f551fb5a09e68000000eaf81122033041007684dbe206b209548db9a93d4ba3e7
a4558da4ff8bdc25d4cf30421f23fe0795d8ed502675dfea6d697d034f9501124ccb53f5f96c8617c301b3b8
5fb4479002e93b1902ace9e60d274b1eab78165321666dfaf43368da507304231c3104de262f76cc7b219f
3b71681b4c1ec50827721d1c2a859dd3a5c4cbf1dfc3688b181e9cac2006d889c8f57f32204c83bfa61603e
138935d7c4d613304c0240beca3941d3288930f7e6efdd1d21545cf7c517c747311be9763fe169ef269706
757717fd3169d4ea05470f5178bf8010ccee3364ab8ac7416df10f3147d41649ada6113

---

---
Segment processing
---

------ Standard for this segment: PKI at index 0 ------

Segment size (based on key strength): 48

Segment data (encrypted):

[[[

196f989dbbbda49be77d3e7ee2f9e1b28878b10809796ee9ae2bba9fada0368e566efef827216c4b094b8b2ebdbb42e5

]]]

Segment data (plain text):

[[[

Cheeseburger Mashed Potato Pie

Ing

]]]

------ Standard for this segment: PKI at index 48 ------

Segment size (based on key strength): 64

Segment data (encrypted):

[[[

38ce64492935fff489c286a43de9ebfd274ee3883ff6e3df299a6fa3f3bb1563e6c3ec2a698bd2ef3bf34d9461987bad725574f132200e38ff81c04400f11c4b

]]]

Segment data (plain text):

[[[ redients

Slow:   4 large skinned and boiled potatoes

]]]

------ Standard for this segment: TripleDES at index 112 ------

Segment size in (based on embedded length: 112

Segment data (encrypted):

[[[

445fa247af13a53590767babef49c02d23cafeb364da2289b61a2f6884b546dca5ac38f779f52ae6eb9ddf60a2dd4ea16aefab4747dcff40172c2dc1e48fc97b09f3205f6011c8d28b0b9f44649913143acf7680f9ef6055f3eb419886bad1ffe6358d0e420272b89a44f9d7a5005d9e

]]]

Segment size out (based on embedded length: 78

Segment data (plain text):

[[[

Fast: 1 (4 7/8 ounce) packet mashed potatoes
1/4-1/2 cup butter

Both

]]]

------ Standard for this segment: PKI at index 228 ------

Segment size (based on key strength): 128

Segment data (encrypted):

[[[

241173c75d38181309a6ac6e6cecd709355a3e70e7ff23fd8efd0ef2cdc94aec5b40e56e576f1ca2c66f30a1
0fec63f3cd7fd4c66118593f5209eefc6e5feda3b103b856d51cfbcb44871fc747cca3c15558bfd5a21c9e9ae
f7a12bcf5df3efee22b89b72af1e740c944673d70d91196ba7365455ea68b31eed9e250019c70af

]]]

Segment data (plain text):

[[[

1/2 lb. ground beef, 2 cups shredded/sliced cheese

Directions

1 Fry the beef in a nonstick pan, and when finished

]]]

------ Standard for this segment: AES at index 356 ------

Segment size in (based on embedded length: 240

Segment data (encrypted):

[[[ ce50dc5abebbde9f4563f611a22afac7a7e5182ca11644f01eb5cf0a0f75dc72ad0496ad923d9641197f58fc
ed8d0bac9175b4b77029731468ac3a6ea198053dc1a154b0fb18a9828fea1968c38749de5a96be515f437f fe4c7a42b96f95aa85ce68db22ec2b50951f227619e310aee8b41cd8b4bf4133c2bf8c9cbecd9710ed9ae24
f87c12c59639cbbb58beecac10da47a3004d9ba505ae7b4dff225de731c9cfbfd12f24bf6c091ef3fe77b276
1098914fbbe5f4cde2b61b770a42bdff1a626ac43ec44b4c1a2749944e8fe87ec2c0b4a16e7dbc12a100a7c
27d647add5995196da3cdb5573590a09936d615e38a0

]]]

Segment size out (based on embedded length: 180

Segment data (plain text):

[[[

, drain off the fat and set it aside.

2 Prepare mashed potatoes, add milk and whip until creamy.

3 In medium baking dish, layer potatoes, beef, 1/2 of cheese, potatoes, res

]]]

------ Standard for this segment: PKI at index 600 ------

Segment size (based on key strength): 48

Segment data (encrypted):

[[[

445bbb586c3c6bb5f31142d90875eb8bcd9d84cdf8438f499b3bc49cc7a86379ac5dc6507a5e2ecb001271
d1d92cec5f

]]]

Segment data (plain text):

[[[ t of cheese on top.

4 Place in 350

]]]

------ Standard for this segment: PKI at index 648 ------

Segment size (based on key strength): 64

Segment data (encrypted):

[[[

062d1cd5147173ad87492cbc55ba1b7501fae200806e69516b91b4f0c9db034b9b5e387d119d541819177f82e1204671f7361aeae2a1da7c22336f551fb5a09e

]]]

Segment data (plain text):

[[[

°F oven, bake until cheese is melted and part of the

]]]

------ Standard for this segment: TripleDES at index 712 ------

Segment size in (based on embedded length: 104

Segment data (encrypted):

[[[ eaf81122033041007684dbe206b209548db9a93d4ba3e7a4558da4ff8bdc25d4cf30421f23fe0795d8ed502675dfea6d697d034f9501124ccb53f5f96c8617c301b3b85fb4479002e93b1902ace9e60d274b1eab78165321666dfaf43368da507304231c3104de26

]]]

Segment size out (based on embedded length: 71

Segment data (plain text):

[[[ potatoes golden brown.

5 Let it set for five minutes and then serve

]]]

------ Standard for this segment: PKI at index 820 ------

Segment size (based on key strength): 128

Segment data (encrypted):

[[[

2f76cc7b219f3b71681b4c1ec50827721d1c2a859dd3a5c4cbf1dfc3688b181e9cac2006d889c8f57f32204c83bfa61603e138935d7c4d613304c0240beca3941d3288930f7e6efdd1d21545cf7c517c747311be9763fe169ef269706757717fd3169d4ea05470f5178bf8010ccee3364ab8ac7416df10f3147d41649ada6113

]]]

Segment data (plain text):

[[[

.

]]]

---
Decrypted view
---

Cheeseburger Mashed Potato Pie

Ingredients

Slow:   4 large skinned and boiled potatoes

Fast:   1 (4 7/8 ounce) packet mashed potatoes

1/4-1/2 cup butter

Both

1/2 lb. ground beef, 2 cups shredded/sliced cheese

Directions
1 Fry the beef in a nonstick pan, and when finished, drain off the fat and set it aside.

2 Prepare mashed potatoes, add milk and whip until creamy.

3 In medium baking dish, layer potatoes, beef, 1/2 of cheese, potatoes, rest of cheese on top.

4 Place in 350°F oven, bake until cheese is melted and part of the potatoes golden brown.

5 Let it set for five minutes and then serve.

---

Embodiments described herein involve combinations of method steps and system elements. These steps and elements may be combined in a plurality of ways to accomplish the same goals. One of ordinary skill in the art will appreciate that not all embodiments have all these components and each may have other components in addition to, or in lieu of, those components mentioned herein. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for securing data, comprising:
   apportioning data into multiple data segments, using a processor, at least one or more of the data segments having a segment length different than the other data segments; and
   applying a pattern key from a plurality of pattern keys, using the processor, to each of the one or more data segments to encrypt the data segment, wherein each pattern key has a key strength; and wherein the key strength of at least one pattern key differs from that of the other pattern keys;
   accessing a Random Number Generator, the Random Number Generator generating a random number, wherein the random number is used by the processor to determine the length of the data segment;
   storing the length of the data segments determined based upon the random number; and
   accessing the stored lengths of the data segments during a decryption process.

2. A method for securing data, comprising:
   applying, using a processor, a pattern key from a plurality of pattern keys to a data segment to encrypt the data segment, each pattern key having a key strength, and wherein the key strength of at least one of the pattern keys differs from that of the other pattern keys;
   determining, using the processor, if the pattern key uses a PKI paradigm;
   if the pattern key uses the PKI paradigm, determining, using the processor, a length of the data segment based upon the applied PKI pattern key, wherein at least one of the data segments has a segment length that differs from the one or more other data segments; and
   if the pattern key uses a cryptographic paradigm other than PKI, determining, using the processor, the length of the data segment using a randomly determined number, and wherein at least one of the data segments has a segment length that differs from one or more other data segments.

3. The method of claim 2, wherein the non-PKI pattern keys apply cryptographic paradigms chosen from the group consisting of: PVSSR, Blowfish, ECC, AES, Gamal, DES, TripleDES, Rijndael, XMX, Serpent, Blowfish, and Twofish.

4. The method of claim 2, further comprises accessing a Random Number Generator, the Random Number Generator generating a random number, wherein the random number is used by the processor to determine the length of one or more of the data segments.

5. The method of claim 4, further including storing the length of the data segments determined based upon the random number.

6. The method of claim 5, further including accessing the stored lengths of the data segments during a decryption process.

7. A method for securing data, comprising:
   apportioning data into multiple data segments, using a processor, at least one or more of the data segments having a segment length different than the other data segments; and
   using the processor to apply a pattern key from a plurality of pattern keys, in accordance with a key pattern, to each of the one or more data segments to encrypt the data segment, wherein each pattern key has a key strength; and wherein the key strength of at least one pattern key differs from that of the other pattern keys:
   accessing a Random Number Generator, the Random Number Generator generating a random number, wherein the random number is used by the processor to determine the length of one or more of the data segments;
   including storing the length of the data segments determined based upon the random number; and
   accessing the stored lengths of the data segments during a decryption process.

8. A method for securing data, comprising:
   using a processor to apply a pattern key from a plurality of pattern keys, in accordance with a key pattern, to a data segment to encrypt the data segment, each pattern key having a key strength, and wherein the key strength of at least one of the pattern keys differs from that of the other pattern keys;
   using the processor to determine if the pattern key uses a PKI paradigm;
   if the pattern key uses the PKI paradigm, using the processor to determine a length of the data segment based upon the applied PKI pattern key, wherein at least one of the data segments has a segment length that differs from the one or more other data segments; and
   if the pattern key uses a cryptographic paradigm other than PKI, using the processor to determine the length of the data segment using a randomly determined number, and wherein at least one of the data segments has a segment length that differs from the one or more other data segments.

9. The method of claim 8, wherein the non-PKI pattern keys apply cryptographic paradigms chosen from the group consisting of: PVSSR, Blowfish, ECC, AES, Gamal, DES, TripleDES, Rijndael, XMX, Serpent, Blowfish, and Twofish.

10. The method of claim 8, further comprises accessing a Random Number Generator, the Random Number Generator generating a random number, wherein the random number is used by the processor to determine the length of one or more of the data segments.

11. The method of claim 10, further including storing the length of the data segments determined based upon the random number.

12. The method of claim 11, further including accessing the stored lengths of the data segments during a decryption process.

13. A method for securing data, comprising:
   receiving plaintext data;
   encrypting the entire received set of plaintext data using a first password and a processor to generate a first encrypted data;

using the processor to apply a pattern key from a plurality of pattern keys, in accordance with a key pattern, to a data segment of the first encrypted data, each pattern key having a key strength and wherein the key strength of at least one of the pattern keys differs from the key strength of the other pattern keys;

determining, using the processor, if the pattern key uses a PKI paradigm;

if the pattern key uses the PKI paradigm, using the processor to determine the length of the data segment based upon the applied PKI pattern key, wherein the length of each data segment is determined by which pattern key is applied to the data segment, and wherein one or more of the data segments has a segment length that is different from one or more other data segments;

if the pattern key uses a cryptographic paradigm other than PKI, using the processor to determine the length of the data segment using a randomly determined number, and wherein one or more of the data segments has a segment length that is different from one or more other data segments; and using the processor to continue to apply the pattern keys, in accordance with the key pattern, until all the first encrypted data has been further encrypted.

14. A system for securing information, comprising:
a memory, the memory storing plaintext data, a plurality of pattern keys, and a key pattern;
a Random Number Generator (RNG) for generating a random number;
a processor, the processor in communication with the memory and the RNG to form circuits and software for:
(a) applying the pattern keys from the plurality of pattern keys, in accordance with the key pattern, to a data segment of the plaintext data to encrypt the data segment, each pattern key having a key strength, and wherein the key strength of at least one of the pattern keys differs from the key strength of the other pattern keys;
(b) determining if the pattern key uses a PKI paradigm;
(1) if the pattern key uses the PKI paradigm, determining the length of the data segment based upon the applied PKI pattern key, wherein one or more of the data segments has a segment length that is different from one or more other data segments;
(2) if the pattern key uses a cryptographic paradigm other than PKI, determining the length of the data segment using the randomly determined number generated by the RNG, wherein one or more of the data segments has a segment length that is different from one or more other data segments;
(c) applying the pattern keys to the one or more data segments to encrypt the plaintext data; and
(d) continuing a-c until all the plaintext data has been encrypted.

15. The system of claim 14, wherein the pattern key is a cryptographic paradigm chosen from the group consisting of: list crypto techniques.

16. The system of claim 14 wherein a first password is used to initially encrypt all of the plaintext data before an initial encryption process began.

17. A system for decrypting data, comprising:
a Random Number Generator (RNG);
a memory, the memory storing an encrypted message, a plurality of pattern keys, a key pattern, and the length of a data segment if such segment length was determined using the RNG random number;
a processor, the processor in communication with the memory and the RNG to form circuits and software for:
(a) applying the pattern keys from the plurality of pattern keys, in accordance with the key pattern, to a data segment of the encrypted message to decrypt the data segment, each pattern key having a key strength, and wherein the key strength of at least one of the pattern keys differs from the key strength of the other pattern keys;
(b) determining if the pattern key uses a PKI paradigm;
(1) if the pattern key uses the PKI paradigm, determining the length of the data segment based upon the applied PKI pattern key, wherein one or more of the data segments has a segment length that is different from one or more other data segments;
(2) if the pattern key uses a cryptographic paradigm other than PKI, determining the length of the data segment using the randomly determined number generated by the RNG, wherein one or more of the data segments has a segment length that is different from one or more other data segments;
(c) decrypting the data segments using the pattern keys, in accordance with the key pattern; and
(d) continuing a-c until all data segments of the encrypted message have been decrypted.

18. The system of claim 17, wherein the pattern key is a cryptographic paradigm chosen from the group consisting of: PKI, PVSSR, Blowfish, ECC, AES, Gamal, DES, TripleDES, Rijndael, XMX, Serpent, Blowfish, and Twofish.

19. The system of claim 17, wherein the resultant decrypted data is further decrypted using a first password that was applied before an initial encryption process began.

* * * * *